US011252220B2

(12) United States Patent
Nauerz et al.

(10) Patent No.: US 11,252,220 B2
(45) Date of Patent: Feb. 15, 2022

(54) DISTRIBUTED CODE EXECUTION INVOLVING A SERVERLESS COMPUTING INFRASTRUCTURE

(71) Applicant: INTERNATIONAL BUSINESS MACHINES CORPORATION, Armonk, NY (US)

(72) Inventors: Andreas Nauerz, Stuttgart (DE); Christian Bickel, Boeblingen (DE); Markus Thoemmes, Boeblingen (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 16/365,810

(22) Filed: Mar. 27, 2019

(65) Prior Publication Data
US 2020/0314168 A1 Oct. 1, 2020

(51) Int. Cl.
*H04L 29/08* (2006.01)
*G06F 9/50* (2006.01)
*H04L 29/06* (2006.01)

(52) U.S. Cl.
CPC ............ *H04L 67/10* (2013.01); *G06F 9/5083* (2013.01); *H04L 67/42* (2013.01)

(58) Field of Classification Search
CPC ...................................................... H04L 67/10
See application file for complete search history.

(56) References Cited

U.S. PATENT DOCUMENTS

| 8,312,473 | B2 | 11/2012 | Bates et al. |
| 9,686,350 | B2 | 6/2017 | Amacker |
| 9,712,468 | B2 | 7/2017 | Patel |
| 10,498,625 | B1* | 12/2019 | Mozealous ............. H04L 67/16 |
| 2015/0334203 | A1* | 11/2015 | Soundararajan ...... G06F 16/182 709/213 |
| 2017/0192825 | A1 | 7/2017 | Biberman et al. |
| 2017/0235707 | A1 | 8/2017 | Amacker |

(Continued)

OTHER PUBLICATIONS

Baldini et al., "Serverless Computing: Current Trends and Open Problems," Research Advances in Cloud Computing, 2017, p. 1-20, Springer Nature Singapore Pte Ltd.

(Continued)

*Primary Examiner* — Nicholas P Celani
(74) *Attorney, Agent, or Firm* — Elliot J. Shine

(57) ABSTRACT

A method for distributed code execution involving a first serverless computing infrastructure, the first serverless computing infrastructure comprising one or more first infrastructure nodes, the one or more first infrastructure nodes comprising a first invocation controller node and one or more first executing nodes, the one or more first infrastructure nodes being communicatively coupled to one or more client nodes, the one or more client nodes being external to the one or more first infrastructure nodes, the method comprising receiving event information, identifying application logic associated with the event information, selecting, from an invoker group, an invoker node for executing the application logic, causing the invoker node to execute the application logic, causing the invoker node to provide a result of the executed application logic, and receiving the result.

19 Claims, 6 Drawing Sheets

(56) References Cited

U.S. PATENT DOCUMENTS

2017/0242737 A1  8/2017  Fink et al.

OTHER PUBLICATIONS

Karpievitch et al., "mGrid: A Load-Balanced Distributed Computing Environment for the Remote Execution of the User-Defined Matlab Code," BMC Bioinformatics, 2006, p. 1-12, BioMed Central Ltd.

Machupalli, "Serverless Computing and Watson Service Chaining via OpenWhisk: Part 1 of 3 Resource Requirements," IBM Cloud Blog, Apr. 18, 2017, p. 1-9, https://www.ibm.com/blogs/bluemix/2017/04/serverless-computing-watson-service-chaining-via-openwhisk-part-1-3-resource-requirements/, Accessed on Mar. 25, 2019.

McGrath et al., "Serverless Computing: Design, Implementation, and Performance," IEEE 37th International Conference on Distributed Computing Systems Workshops, 2017, p. 405-410, IEEE Computer Society.

MSV, "An Architectural View of Apache OpenWhisk," The New Stack, Feb. 3, 2017, p. 1-14, https://thenewstack.io/behind-scenes-apache-openwhisk-serverless-platform/, Accessed on Mar. 25, 2019.

Spillner, "Snafu: Function-as-a-Service (FaaS) Runtime Design and Implementation," arXiv Computer Science, Mar. 23, 2017, p. 1-15, arXiv: 1703.07562v1.

Thömmes, "Uncovering the Magic: HowServerless Platforms Really Work!," Medium, Oct. 11, 2016, p. 1-8, https://medium.com/openwhisk/uncovering-the-magic-how-serverless-platforms-really-work-3cb127b05f71, Accessed on Mar. 25, 2019.

\* cited by examiner

DISTRIBUTED CODE EXECUTION INVOLVING A SERVERLESS COMPUTING INFRASTRUCTURE

BACKGROUND

The present disclosure relates to distributed execution of computer-executable instructions under involvement of a serverless computing infrastructure.

Serverless computing is a cloud-computing execution model in which a cloud provider runs the server, and dynamically manages machine resources allocation. Pricing is based on the actual amount of resources consumed by an application, rather than on pre-purchased units of capacity. Serverless computing can simplify the process of deploying code into production. Scaling, capacity planning, and maintenance operations may be hidden from the developer or operator. Serverless code can be used in conjunction with code deployed in traditional styles, such as microservices. Alternatively, applications can be written to be purely serverless and use no provisioned servers at all.

Event-driven serverless computing is a topic of ongoing research in the field of cloud computing and is considered to have a potential to fundamentally change the technical prerequisites of cloud-native application development. Serverless computing may relieve developers from the need to care about low-level infrastructural and operational details (e.g., scalability, high-availability, infrastructure security, and so forth) and enable them to focus on quickly developing value-adding code.

The code being developed is executed on a per-request basis only when really necessary ("on-demand"). This may provide an optimal utilization without having to pay for idle resources while the infrastructure is waiting for the next request to arrive. Similarly, serverless computing is expected to provide an optimal scaling behavior by providing the exact amount of resources needed at a certain point in time. The need for maintaining and paying for overcapacities may be drastically reduced in contrast to more traditional models.

Serverless computing models typically rely on an event programming model where code elements (also known as actions or functions) are executed in response to events. For this reason, serverless platforms are often referred to as function-as-a-service (FaaS) platforms, too. Even though such models are called serverless, they still utilize servers; they are only hidden from the user by the abstraction model.

IBM's OpenWhisk® (OpenWhisk is a registered trademark of International Business Machines Corporation and/or its affiliates) is one example of a concrete technical implementation of a serverless platform. OpenWhisk® is based upon a complex infrastructure comprising multiple virtual machines (VMs) which determine the flexibility and capacity of the platform.

SUMMARY

According to one aspect of the present disclosure, a method for distributed code execution involving a first serverless computing infrastructure, the first serverless computing infrastructure comprising one or more first infrastructure nodes, the one or more first infrastructure nodes comprising a first invocation controller node and one or more first executing nodes, the one or more first infrastructure nodes being communicatively coupled to one or more client nodes, the one or more client nodes being external to the one or more first infrastructure nodes, the method comprising, by the first invocation controller node: receiving an event information; identifying an application logic associated with the event information; selecting from an invoker group an invoker node for executing the application logic, wherein the invoker group comprises one of the one or more first executing nodes and one of the one or more client nodes; causing the invoker node to execute the application logic and provide a result of the execution; and receiving the result.

According to another aspect of the present disclosure, a computer program product, in particular a computer-readable medium, the computer program product carrying computer-executable code for execution by a processor controlling an apparatus, wherein execution of the instructions causes the processor to perform a method for distributed code execution involving a first serverless computing infrastructure, the first serverless computing infrastructure comprising one or more first infrastructure nodes, the one or more first infrastructure nodes comprising a first invocation controller node and one or more first executing nodes, the one or more first infrastructure nodes being communicatively coupled to one or more client nodes, the one or more client nodes being external to the one or more first infrastructure nodes, the method comprising, by the first invocation controller node: receiving an event information; identifying an application logic associated with the event information; selecting from an invoker group an invoker node for executing the application logic, wherein the invoker group comprises one or more of the first executing nodes and one or more of the client nodes; causing the invoker node to execute the application logic and provide a result of the execution; and receiving the result.

According to a further aspect of the present disclosure, a load-balancing component for distributed code execution involving a first serverless computing infrastructure and one or more second serverless computing infrastructures, the load-balancing component communicatively interfacing the first serverless computing infrastructure and the one or more second serverless computing infrastructures, wherein each of the one or more second serverless computing infrastructures comprise one or more communicatively coupled second infrastructure nodes, the one or more communicatively coupled second infrastructure nodes comprising a second invocation controller node and one or more second executing nodes, the load-balancing component being adapted, in response to receiving from the first serverless computing infrastructure a request for executing an application logic, for selecting one of the one or more second serverless computing infrastructures for executing the application logic, and causing the second invocation controller node of the selected one or more second serverless computing infrastructures to: select one of the one or more second executing nodes of the selected one or more second serverless computing infrastructures to execute the application logic; and cause the selected one or more second executing nodes to execute the application logic and provide a result of the execution.

Embodiments of the present disclosure are given in the dependent claims. Embodiments of the present disclosure can be freely combined with each other if they are not mutually exclusive.

BRIEF DESCRIPTION OF THE SEVERAL VIEWS OF THE DRAWINGS

In the following, embodiments of the present disclosure are explained in greater detail, by way of example only, making reference to the drawings in which.

DETAILED DESCRIPTION

Figure 1:
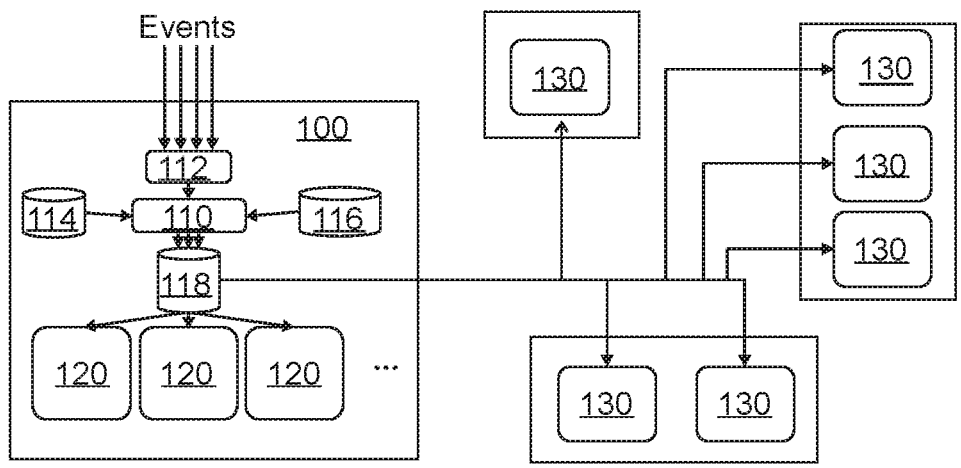
FIG. 1 depicts an exemplary computing environment comprising a serverless computing infrastructure in communicative connection with client nodes, in accordance with embodiments of the present disclosure.

While a user (e.g., an application developer) of a serverless computing infrastructure, or platform, may not need to take care of provisioning a suitable amount of computing capacity in advance, the platform operator still has an interest to ensure that performance peaks can still be handled since the capacity of the platform is still hardware-limited. Therefore, there is a need for operating a serverless computing platform, such as FaaS, that has a higher operational flexibility.

Unlike in a traditional cloud platform, executing an application on a serverless computing platform does not require the application to always be up and running. Instead, the user can develop code pieces (which may be relatively small) that represent an application's logic, and the user can upload them to the serverless computing platform. The uploaded code pieces can then be executed on demand. Additionally, the user need not worry about scaling of the code execution. The code can be executed in parallel, once, or thousands of times. Furthermore, the user need not pay for idling resources. Instead, such considerations are handled by the FaaS provider, thus enabling the user to focus on developing value-added code pieces.

In exemplary embodiments, the code pieces being developed by the user are run on the serverless system when necessary (i.e., "on-demand") and on a per-request basis. This guarantees optimal utilization wherein the user does not pay for idling resources. Similarly, serverless computing guarantees an optimal scaling by always providing the exact amount of resources needed at a certain point in time, thereby saving the user from maintaining and paying for over-capacities.

FaaS may also be preferable over a traditional cloud platform where completing a user's workload requires a scale-out having hard-to-predict factors. For instance, a cloud provider cannot always predict when the user will initiate the next burst of workloads.

In exemplary embodiments, the serverless system can get overloaded with too many user requests. In such instances, the present disclosure combines several serverless systems (i.e., clusters), to be able to handle the load that would otherwise overload a single serverless system.

Embodiments of the present disclosure are applicable at least to serverless computing platforms with connected clusters that are used to execute code pieces provided by the user, rather than by the serverless cloud platform provider. The user's code pieces are executed on a per-request basis, and as fast as possible.

A serverless computing infrastructure is understood herein as a managed association of execution nodes which are dedicatedly kept available to offer computing services to one or more users. Nodes of the same infrastructure are referred to as "local" in the sense of having a comparably low communicative latency (e.g., virtual machines running on the same server), whereas "global" entities typically have a communicative latency (e.g., internet or WAN connections) which substantially exceeds that of the nodes of a given infrastructure, and are therefore considered as distinct nodes independent of the given infrastructure.

Some or all of the nodes described in the present disclosure, including the nodes shown in the Figures, may be implemented as hardware devices or virtual machines. Likewise, some or all of the communication connections and interfaces described in the present disclosure, including those shown in the Figures, may be implemented as hardware or virtualized connections and interfaces.

The serverless computing infrastructure further comprises an invocation controller adapted for managing code executions in response to received event streams. A serverless computing infrastructure may further comprise, without restriction, a storage location (e.g., a database) for storing one or more application logics and further infrastructure-specific information to be used by the controller as described herein; a web server for receiving event information and exchanging data between the controller and requesting entities (e.g., users' workstations, cloud-operated services); a service detector adapted for regularly verifying availability of computing nodes and updating the controller with corresponding availability information; and a stream processor for exchanging information between invoker nodes (i.e., any nodes which have been appointed for executing a particular application logic) and the controller.

The term "application logic" refers to source code or computer-executable (interpreted or compiled) code implementing an application which may be offered by a given infrastructure as a function to a user. In other words, application logic is hereby defined as any sort of computer code or any sort of computer program including, but not limited to, apps distributed through app stores. An "event" may be an invocation request for one or more of such functions, wherein an action, function, or task comprises a specification for executing one of more different application logics. An event may also comprise any further kind of external triggering of a function provided by the infrastructure, for example, a capability to receive and register new code to be provided as a new function.

The method for distributed code execution involving a first serverless computing infrastructure, according to embodiments of the present disclosure, may provide the advantageous capability to transfer an invocation to an additional invoker external to the first serverless computing infrastructure which originally received the invocation request. This may allow the receiving first serverless computing infrastructure to handle usage peaks with a reduced need for overprovisioning, provide scalability beyond hardware-determined performance limitations of the first serverless computing infrastructure, and impose a lower requirement on the infrastructure operator for providing redundant hardware. The current disclosure outlines an approach which may significantly improve resource utilization and flexibility for processing requested actions without any changes to the serverless computing infrastructure hardware or abstraction models as they are currently operating and available. The method may provide a transparent, facultative access to both infrastructure-internal and -external computing resources.

An application logic may be included in the event information or may be referenced by the event information (e.g., using a hyperlink); but alternatively the event information may contain no hint on which application logic should be executed in response to the event. In the latter case, identifying the application logic associated with the event information may comprise, for example, applying rules to the event information or a database lookup. In case the application logic is not stored or initialized at a selected invoker node, the logic may be provided to or retrieved by the invoker node. The step of causing the invoker node to execute the application logic may comprise causing the invoker to interpret the application logic in order to make it executable.

The present approach may be implemented with an automatic client registration routine, which may relieve the user from the need to register with the platform in order to participate with the user's workstation as a client computing node.

According to embodiments, the invoker node executes a software framework, the execution of the application logic comprising interpreting the application logic by the software framework.

A software framework may enhance the native capabilities of a client node to execute code from external. For instance, the software framework may comprise an interpreter for a code language which was previously unknown to the client, thus providing the capability to process an application logic in a language which is expected to be understood by the executing nodes of the platform by default. A software framework may further provide functions so as to assure a particular service or security level for future executions; functions for correctly interpreting metadata associated with the application logic, and/or functions for aggregation and communication of available service features and system health indicators to the platform. The software framework may further implement availability features such as ensuring that the application logic be executed with a higher priority on the operating system kernel and/or preventing the client node from spontaneous shutdown as it may be triggered, for example, by a user who is unaware of an ongoing background execution.

According to embodiments, the communicative coupling between a given one of the one or more client nodes and the first serverless infrastructure comprises a session between the given client node and a web server, the web server hosting a web page, the web page embedding an implementation of the software framework as a browser-executable code, the given client node executing a web browser, the method further comprising, by the first invocation controller node, receiving an availability information, the availability information being generated by the software framework in response to the web page being loaded by the web browser, and determining a membership of the given client node in the invoker group based on the availability information.

A browser-implemented framework may lower the barrier for participating in the computing capacity pool of the serverless platform. For instance, a user of the client node may not be required to actively register (e.g., create a user account) at the platform as an external capacity provider. Web-server-based registration in the background (e.g., implemented on a frequently visited public website) may make the participation transparent to the user. This may be especially useful if the application logic is a "code snippet", i.e., its expected execution time is short (e.g., below a predetermined execution time threshold).

The determination of membership of the node based on the availability information may include that the node can be added as an entry to the group if it is detected as available for the first time; marking a node entry of the group as busy if its utilization is, for example, above a predetermined threshold value; and/or removing the node entry from the group if it has become unavailable. The runtime system may be advantageously implemented in a browser-executable scripting language such as JavaScript® (JavaScript is a registered trademark of Oracle Corporation and/or its affiliates).

According to embodiments, the web page allows the user to agree on background execution of tasks provided by the serverless infrastructure. This may allow the user to prevent participation (e.g., if the user wishes to reserve the capacity of their workstation for a private purpose). The web page may further inform the user about potential background code execution if the user continues to visit the web page.

According to embodiments, the method further comprises, by the first invocation controller node, for each node out of the invoker group, receiving a health status information of the node according to a predetermined schedule, and determining a membership of the node in the invoker group based on the health status information.

Determining a membership of the node in the invoker group based on the health status information may allow the controller to use the health status information as an indirect hint on availability of the checked nodes, and thus perform automatic service discovery (including, for example, adding and removing of nodes to the invoker group based on their availability). Further, the health information may enable the controller to base the selection of a candidate node as the invoker based on the respective current health status of the candidate node. Health status information may include, without limitation, information descriptive of available hardware and/or software features implemented in the respective node (e.g., available central processing unit (CPU) instruction set, running operating system), and/or current, or currently averaged, capacity data of the node's CPU and/or memory, for example.

According to embodiments, the first infrastructure nodes further comprise a first application repository node, the first application repository node having stored therein one or more hosted application logics, the hosted application logics comprising the application logic, the method further comprising, by the first invocation controller node, for each hosted application logic, tracking an execution indicator specific to the hosted application logic, and aggregating the execution indicator into a capacity figure specific to the hosted application logic, wherein the selection of the invoker node comprises, in case the capacity figure specific to the application logic is within a predetermined low-capacity range, selecting one of the client nodes as the invoker node.

This may ensure that tasks requiring (actually or expectedly) a high computing capacity are processed by the internal executing nodes of the first infrastructure, thus taking into account that client nodes may often offer reduced computing capacities compared to the infrastructure executing nodes, may have a comparatively high communicative and/or computational latency, and/or may have a potentially unstable communicative connection to the platform (e.g., the user may be unaware of the execution and decide to shut down the client node's operating system).

A capacity-driven invoker selection may require to track, for each action, typical (e.g., statistical) computing capacity figures and/or typical execution times of client nodes. Aggregation may make the approach more resilient against, for example, short usage peaks. A given application logic may then be executed on an infrastructure node (executing node) if the aggregate figure is in a high-capacity range (e.g., above or below a respective threshold value, depending on the kind of capacity measure), and on a client node otherwise.

According to embodiments, the method further comprises, by the first invocation controller node, causing the invoker node to keep the application logic initialized after the execution.

An application logic is defined as initialized at a given node if the latency time between receiving an invocation request by the node and starting execution of the requested logic is in a shortest order achievable by the given node. This is usually the case if the logic is stored in a low-latency memory (e.g., random access memory (RAM)) in a fully interpreted or compiled state. For comparison, storing the logic as source code on a hard drive usually increases the latency substantially. Increasing the latency may ensure that execution of the logic can be repeated with a small latency, without re-interpreting the code.

According to embodiments, the selection comprises determining an initialized group specific to the application logic, wherein a given node of the invoker group is in the initialized group if the given node is keeping the application logic initialized, the invoker node being selected out of the initialized group in case the initialized group is not empty. This may reduce the latency incurred by the invoker selection process and/or the communication between the controller and the client nodes.

According to embodiments, the method further comprises, by the first invocation controller node, receiving from a candidate node out of the invoker group one or more of the following support identifiers relating to the candidate node: a current capacity utilization; an available computing capacity; a system health information; a latency figure; and an indicator for support of private execution, the event information further comprising an execution requirement, the selection further comprising determining a candidate node with a best agreement to the execution requirement by comparing the execution requirement to the respective support identifiers received for each candidate node in the invoker group, and selecting the candidate note with a best agreement as the invoker node.

This may ensure, especially when the controller is configured for combining or weighting different kinds of support identifiers, that each application logic can be executed under maximally optimized conditions. For instance, applications with a long running time may be executed on high-capacity nodes, while applications with a short running time may be executed on low-capacity nodes; nodes with a poor health status may be spared, and thus the execution time may be minimized for each invocation. This may ensure an optimum utilization of the nodes in the invoker group and reduce the performance impact of a high-capacity task on concurrent low-capacity tasks. For instance, the execution requirement may comprise, without limitation, one or more of a maximum allowed execution time, an indicator requesting a least set of privacy features, a bit width identifier (e.g., the application logic comprises a 64-bit code), etc.

According to embodiments, the communicative coupling of the first infrastructure nodes comprise a permanent connection between the first invocation controller node and each execution node; and/or the communicative coupling of the first infrastructure to the one or more client nodes comprises a connection via a wide-area network. This may have the effect of reducing the communicative latency of the infrastructure nodes and/or enabling increasing the number of available client nodes by providing communicative access to a large geographical region.

According to embodiments, the first infrastructure nodes further comprise a dispatching node, the invoker group further comprising the dispatching node, the dispatching node providing a communications interface to a global load balancer, the global load balancer being further communicatively coupled to one or more second serverless computing infrastructures, each second infrastructure comprising communicatively coupled second infrastructure nodes, the second infrastructure nodes comprising a second invocation controller node and one or more second executing nodes, wherein, in case that a predetermined dispatch condition is fulfilled, the selection comprises selecting the dispatching node as the invoker node, and the causing of the invoker node to execute the application logic and provide a result of the execution comprises, via the dispatching node, causing the global load balancer to: select one of the second infrastructures for executing the application logic; and cause the second invocation controller node of the selected second infrastructure to: select one of the second executing nodes of the selected second infrastructure to execute the application logic; and cause the selected second executing node to execute the application logic and provide a result of the execution.

This may provide the beneficial capability to use executing nodes (the second executing nodes) of further platforms (the second infrastructures) as additional external computing resources. This may be useful if the first platform is requested to perform a large number of high-capacity tasks which were unfeasible to be handled by the lower capacity of a client node. The second execution nodes may also offer a higher availability than client nodes, because both the first and the second infrastructures can be regarded as permanently available and the connections via the global load balancer can be regarded as permanent (non-spontaneous) connections through communications infrastructures.

An invocation on an external platform may be selected for numerous dispatch conditions, including a high utilization or a poor health status of the first platform or one of its nodes, and/or missing or sub-optimal support for a particular execution requirement (e.g., regulative compliance).

It is understood that the first platform may also be one of a cluster of first serverless infrastructures (e.g., each platform being implemented as one or more virtual machines running on a same server, and each platform of the cluster being implemented analogously on a dedicated server of a computing center) between which tasks may be dispatched without using the global load balancer. The platforms of a given cluster may typically feature a communicative latency which is larger than the communicative latency of the nodes of the same platform, but shorter than the communicative latency incurred, for example, when communicating to client nodes over a wide-area network. However, the example of multiple platforms in the same computing center shows that situations may occur where, for example, none of the cluster platforms offers a required compliance. In this case, requesting execution on a cluster-external platform may enable a successful and compliant execution of the application logic even if the requested first platform does not support or comply with the requirements of a specific application.

According to embodiments, the dispatch condition comprises selecting the dispatching node as the invoker node in case an aggregate current capacity utilization of the first executing nodes exceeds a predetermined first threshold value.

This may enable a flexible scaling of computing capacities, for example, at peak utilization times even beyond the capacity limits of the hardware on which the platform is running. Exceeding a threshold value may be equally understood as being greater than the threshold value if the capacity measure indicates a negative or absent capacity (e.g., a degree of system utilization), and lower than the threshold value, for example, if the capacity measure indicates a positive or present capacity (e.g., percentage of available CPU time and/or memory).

According to embodiments, the selection of one of the second serverless infrastructures for executing the application logic is based on one or more of the following status indicators of the respective second serverless infrastructure: a current capacity utilization; an available computing capacity; a system health information; a latency figure; and an indicator for support of private execution. This may reduce latency of the execution and/or ensure a uniform utilization of the second serverless infrastructures.

According to embodiments, the method further comprises, by the first invocation controller node, collecting metadata associated with the application logic, the metadata comprising a required service level and one or more of a wait figure representative of an elapsed wait time for the execution of the application logic; a desired maximum wait time; and a typical execution time aggregating past run time measurements of the application logic, the causing of the selected second serverless infrastructure further comprising causing the second invocation controller to determine a waiting queue position for the application logic, the determination of the waiting queue position being based on a ranking according to the required service level and a sub-ranking according to the one or more of the wait figure, the desired maximum wait time, and the typical execution time.

A ranked queueing of tasks may define a priority scale for the execution. For instance, applications requiring a short execution time (i.e., which may be urgent or are not expected to consume a large amount of resources) may be queued with a higher priority than long or resource-intensive tasks; or tasks which have been waiting for a long time should be served even if they have a long execution time. The global load balancer may apply an appropriate weighting scheme to determine the threshold between competing measures.

It may be possible to allow, for example, a platform administrator to configure the set of metadata for each respective serverless infrastructure. The configuration metadata may be stored, for example, on a server-based configuration database. The queueing order may be applied, for example, by filtering. A platform administrator may further have the option to use the results of the ranking process to see if the individual set of service levels and wait times can be fulfilled by the existing and available set of metadata for each respective serverless infrastructure. Conflicts may be resolved by manually adjusting the extended metadata respectively.

According to embodiments, the metadata further comprises a distribution time measured between the receipt of the event information and the selection of the selected second serverless infrastructure, the determination of the sub-ranking comprising calculating a sub-rank priority value P using the formula $$P=A(1-W/M)+B(1-D/E),$$

wherein A and B are free parameters, W is the wait figure, M is the desired maximum waiting time, D is a distribution time, and E is the typical execution time.

The two free dimensionless parameters A and B may provide the capability to define individual weights for ranking a task based on waiting time rather than distribution time, or vice versa. In this way it may, for example, be possible to enforce short waiting times by setting a value for A which is large compared to B. In an embodiment, A and B are complementary percentages, for example, $0 \le A \le 1$, $0 \le B \le 1$, and $A+B=1$.

According to embodiments, the causing of the selected second serverless infrastructure further comprises, in case P is greater than or equal to a predetermined critical sub-rank priority value, causing the second invocation controller to cancel an execution of a low-priority application logic, the low-priority application logic having assigned a sub-rank priority value less than the critical sub-rank priority value.

This may further reduce the waiting time for high-priority tasks on the same service level. In this case, canceled low-priority tasks may be queued on the same platform again after execution of the high-priority task has started, or transferred to another platform, for example, a platform currently having more idle capacities or a comparatively low number of high-priority tasks.

According to embodiments, the cancellation is performed according to a cancellation priority, wherein the low-priority application logic is assigned a highest cancellation priority if the low-priority application logic causes the selected second serverless infrastructure to perform a housekeeping function, followed by a next lower cancellation priority if the execution of the low-priority application logic has an expected relative remaining execution time below a second threshold value, followed by a next lower cancellation priority if the execution of the low-priority application logic has a largest expected absolute remaining execution time.

This may define a useful prioritization of cancellation conditions. For instance, housekeeping functions (e.g., virus scanning or garbage collection) are internal functions which should be executed to ensure a correct functioning of the platform, but should not impact service quality, for example, by causing delay to tasks running for an external caller. The subsequent timing conditions may reduce capacity costs incurred by the cancellation (i.e., capacity used by the cancelled job(s) which could have been free if the need for high-priority execution had been known earlier). The cancellation procedure can be defined with higher granularity of sub-priorities, if required.

According to embodiments, the global load balancer further utilizes a second application repository, the causing of the global load balancer further comprising, in case the application logic is not registered at the second application repository, causing the global load balancer to register the application logic at the second application repository and distribute the application logic to one or more of the second serverless infrastructures.

Such automatic propagation of newly registered application logics may reduce invocation latency for each new logic by avoiding a distribution of the new logic after receiving an invocation request for the new logic.

According to embodiments, the event information comprises an identifier requiring compliance with a regulation specification, one or more of the second serverless infrastructures complying with the regulation specification, the dispatch condition comprising selecting the dispatching node as the invoker node in case that the first serverless infrastructure is not compliant with the regulation specification, the selection of one of the second serverless infrastructures for executing the application logic being restricted to the one or more compliant second serverless infrastructures. This may provide a higher flexibility by enabling an execution of a regulated application even if the platform first handling the request does not comply with the specifications of the requested regulation.

According to embodiments, the serverless computing infrastructure is an OpenWhisk® infrastructure. The OpenWhisk® computing infrastructure may provide a comprehensive environment for implementing the method for distributed code execution involving a first serverless computing infrastructure.

FIG. 1 depicts an exemplary computing environment comprising a serverless computing infrastructure 100 in communicative connection with client nodes 130, in accordance with embodiments of the present disclosure. The serverless computing infrastructure 100 comprises multiple executing nodes 120, an invocation controller node 110, and several controller support nodes 112, 114, 116, 118 for directly exchanging information with the controller 110. While embodiments are not limited to the exemplary support nodes shown in FIG. 1, the support nodes 112, 114, 116, 118 comprise a web server 112, a database 114, an availability checker 116, and a stream processor 118.

The web server 112 (e.g., a running nginx server) is adapted for receiving event information (i.e., descriptive of an event) from a requesting computing node (not shown) outside of the serverless computing infrastructure 100. An event information may comprise a specification of an application logic to be executed or a typically human-readable (uncompiled) code of such application logic. If the event information comprises no explicit specification of an application logic, the controller 110 uses the database to determine if the event is known and an application logic is stored in the database for the given event. If an associated application logic is successfully determined for the given event, the controller 110 forwards a result of the execution to the requesting node via the web server 112.

The database 114 (which typically includes a database management system) preferably comprises datasets, each of which comprises one or more descriptors of event information specific to a particular event, one or more application logics associated with the specified event, and metadata of the associated logics (e.g., version information and/or execution requirements). The controller may use such datasets to determine and retrieve the application logic(s) associated with a given event. The database 114 may further comprise authentication information which allows the controller to determine whether a user requesting execution of a task is authorized to do so. The database may further be adapted for storing session-related information (e.g., an identifier of an HTTP session, an activation ID assigned to the requested execution task, and/or result(s) of an execution) which may allow for implementation of enhanced features, such as asynchronous invocation.

The availability checker 116 comprises an engine which utilizes platform-internal connections to the execution nodes as well as a communications interface for contacting the client nodes 130 to receive a health status, and thus indirectly an availability information, of each contactable executing node 120 and client node 130. This may be repeated on a regular basis so as to keep the controller 110 up-to-date about the content of the invoker group.

The stream processor 118 may be used by the controller 110 to communicate with the executing nodes 120 and client nodes 130. For instance, the controller 110 may use the stream processor 118 to call a selected invoker node to execute the application logic, forward execution parameters to the invoker node, and receive a result of the execution from the invoker node. The stream processor 118 may also be used to transmit the application logic(s) to the invoker if it has not been initialized in the invoker yet.

While the stream processor 118 is capable of forwarding an invocation both to internal executors 120 and external executors 130, it is up to the invocation controller 110 to decide if a given invocation should be forwarded to an internal node 120 or an external node 130.

The stream processor 118 also connects to the client nodes 130 which are not managed by the invocation controller 110 or any other control device which might be present on the serverless computing infrastructure 100. The serverless computing infrastructure 100 forms an infrastructure which is designed and implemented as a permanent service and whose nodes are supposed to be permanently accessible. Nonetheless, the availability checker 116 also checks availability for the platform-internal executing nodes 120 to prevent failure of the serverless computing infrastructure 100 (e.g., if one of the executing nodes 120 freezes or is shut down for maintenance).

In contrast, the connection of the client nodes 130 to the serverless computing infrastructure 100 rather resembles a client-server relationship, including a typically limited temporal availability. The client nodes 130 do not necessarily have to support a specific code language for which the serverless computing infrastructure 100 might be configured by default. For these reasons, the client nodes 130 may be running a dedicated software framework which ensures, for example, that interpreter capability is available for all default languages of the serverless computing infrastructure 100, that compliance with a predefined level of security is given, and/or that system shutdown of a client node 130 is delayed until an execution of an application logic has finished. In particular, the client nodes 130 may be connected to the serverless computing infrastructure 100 by a wide-area network, including the internet, but alternatively also a local-area network, a bus, a wireless hub, etc.

Figure 2:
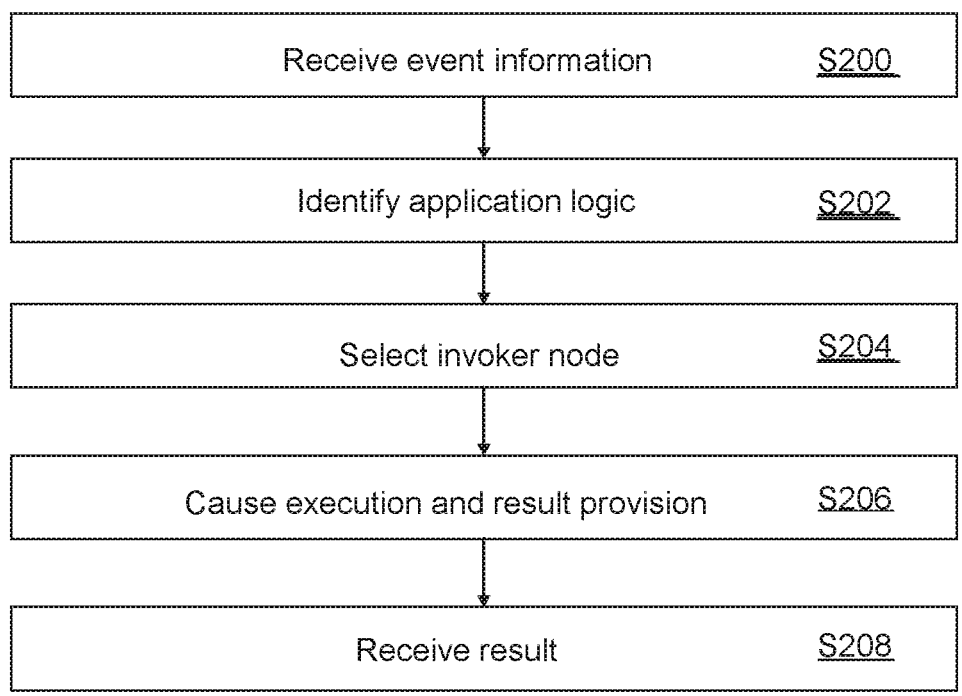
FIG. 2 illustrates a process flow of a method for distributed code execution, in accordance with embodiments of the present disclosure.

FIG. 2 illustrates a process flow of a method for distributed code execution involving a serverless computing infrastructure 100 as described before, in accordance with embodiments of the present disclosure. In step S200, the invocation controller node 110 receives an event information. The event information is descriptive of an event which requires an execution of a specific, associated application logic. The controller 110 uses this peculiarity to identify S202 the associated application logic associated with the event information. This can be done, for example, by reading the application logic in case that it is included in the event information; by following a link to the application logic provided with the event information; or by looking up a descriptor of the event or the event information in a database storing known events and their associated application logics.

In step S204, the controller 110 selects an invoker node for executing the application logic. The invoker node is selected out of an invoker group comprising one or more of the executing nodes 120 and one or more of the client nodes 130. The decision whether to execute the logic on an executing node 120 (i.e., internal to the serverless computing infrastructure 100) or on a client node 130 (i.e., a node which is reachable for the serverless computing infrastructure 100, but not provided as a part of the implementation of the serverless computing infrastructure 100) may be based on various facts, including the degree of utilization of the serverless computing infrastructure 100 and the presence or absence of a requirement for a particular feature the invoker should provide during the execution (e.g., absence or presence of a desired maximum execution time, a required regulatory or security compliance, etc. in metadata provided with the event information). Step S204 may include the option to delay or reject the requested execution in case that no appropriate invoker is available.

If an appropriate invoker node is successfully identified, the controller 110 causes S206 the invoker node to execute the application logic. The invoker node executing the application logic (step S206) may include one or more of the subroutines outlined below. Usually, step S206 includes conveying input information to be used or taken into account by the application logic during execution. The input information may include input data to be processed by the application logic as well as parameters governing details of the processing. Step S206 may further include queueing the application logic with its associated input and/or metadata in an internal queue of the invoker node. Furthermore, it may be necessary to interpret the application logic if it is not provided as machine code, which may be the case if the application logic is platform-independent. The initialized application logic (i.e., interpreted and loaded into a low-latency memory of the invoker, such as its RAM) may be kept initialized after completion of the execution, which may reduce latency if a repeated execution of the same logic is required (e.g., by a later event).

During and after the execution, the invoker node generates and/or collects information coming from, or related to, the output of the application logic as a result dataset. Step S208 comprises receiving the result by the controller 110 as the invoker node provides the result to the controller 110. In response, the controller may directly forward the result to the issuer of the event or store it in database 114, for example, for later retrieval by the issuer.

Figure 3:
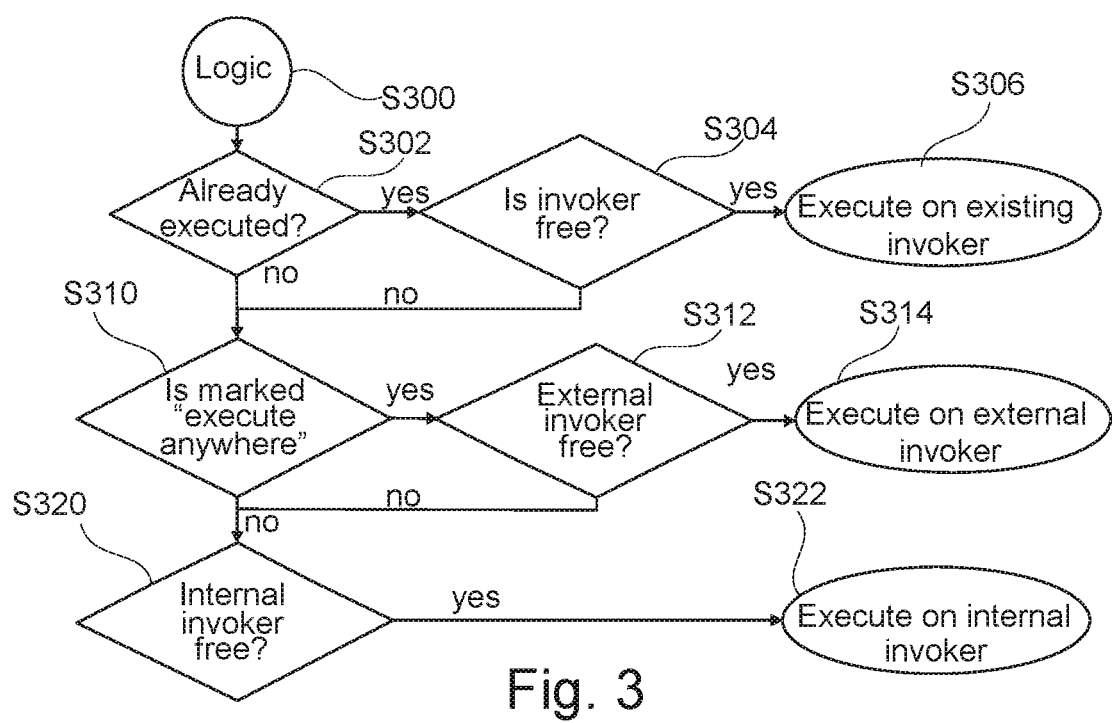
FIG. 3 illustrates a process flow of a load balancer decision regarding internal or external invocation, in accordance with embodiments of the present disclosure.

FIG. 3 illustrates an exemplary process flow of a load balancer decision of the controller 110 regarding whether a given application logic should be invoked internally (i.e., by an executing node 120) or externally (i.e., by a client node 130), in accordance with embodiments of the present disclosure. In step S300 the controller 110 determines, as described above, the application logic to be executed. Next, the controller 110 determines S302 if the logic has already been executed, for example, by looking up metadata of the logic in database 114; by going through historical metadata of the member nodes of the invoker group describing logics which are initialized and/or stored at each node; by requesting the logic at each suitable node in the invoker group (i.e., nodes complying with given execution requirements), etc.

If the requested logic is found at a given candidate node, the controller determines S304 whether the candidate node is free to execute the requested logic. This does not necessarily mean that the candidate node should be idle; instead, it may also be eligible if its utilization (e.g., an average recorded during the last minute) is below a predetermined threshold value; or if it has an internal job queue which is short enough to allow a latency estimation below a predetermined threshold value or a latency limit specified in the event information. If the candidate node is found eligible under S304, the candidate node is accepted as the invoker node for the requested execution and the requested logic is queued in the task queue (including instantaneous execution if the queue is empty) of the selected invoker for execution S306.

If the candidate is not eligible under S304 or S302, the routine continues with checking S310 if the requested logic is marked with an "execute anywhere" identifier in the event information or application metadata (e.g., from the database 114). If such identifier is found set, the controller determines S312 if an external invoker 130 is free as defined analogously in S304 above. If a free client node 130 is found, the free client 130 is accepted as the invoker node for the requested execution and the requested logic is queued in the task queue (including instantaneous execution if the queue is empty) of the selected external invoker 130 for execution S314.

If the candidate is not eligible under S310 or S312, the routine continues with checking S320 if an internal invoker 120 is free as defined analogously in S304 above. If a free executing node 120 is found, the free node 120 is accepted as the invoker node for the requested execution and the requested logic is queued in the task queue (including instantaneous execution if the queue is empty) of the selected internal invoker 120 for execution S322.

Figure 4:
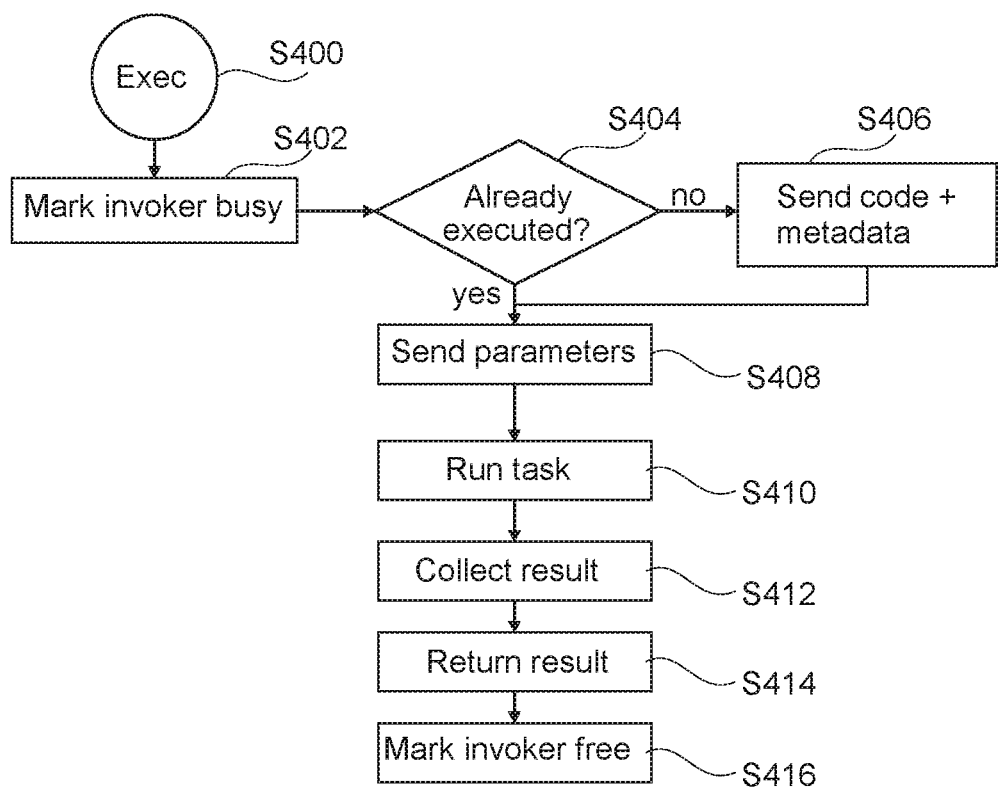
FIG. 4 illustrates a process flow for external invocation, in accordance with embodiments of the present disclosure.

FIG. 4 illustrates an exemplary process flow for external invocation of an application logic, in accordance with embodiments of the present disclosure. The process starts with the invocation controller 110 selecting S400 an eligible candidate client node 130 as the invoker node for the requested execution of the application logic. The invoker 130 is marked S402 as busy in an internal node management data structure. Then the controller 110 checks S404 whether the application logic is already stored at the invoker node 130 (e.g., if it was executed by the same invoker node earlier). If the invoker 130 is not storing the requested logic, the controller S406 causes the invoker node 130 to receive the code of the application logic (e.g., by forwarding the code directly or supplying a link which allows the invoker 130 to retrieve the code from database 114, for example). The code is usually provided together with descriptive metadata which allow the invoker 130 to apply a required configuration (e.g., using a version number to ensure compatibility of libraries used by the logic; setting security and capacity configuration options; etc.) before starting the execution.

As the invoker 130 completes initialization of the code to be executed (including interpretation and loading), the invocation controller 110 passes execution-specific parameters S408 to the invoker node 130. Some or all of these parameters may be included in the event information, retrieved from the database 114, or inferred from the event information using rules. The application logic is then executed S410 by the invoker node 130 with the configuration settings and parameters set as required. The invoker node 130 collects S412 a result dataset from and/or relating to an output of the executed application logic and returns S414 the result to the controller 110. The controller 110 then passes the result to the caller or a storage location such as database 114 and marks S416 the invoker as free in the internal node management data structure.

Figure 5:
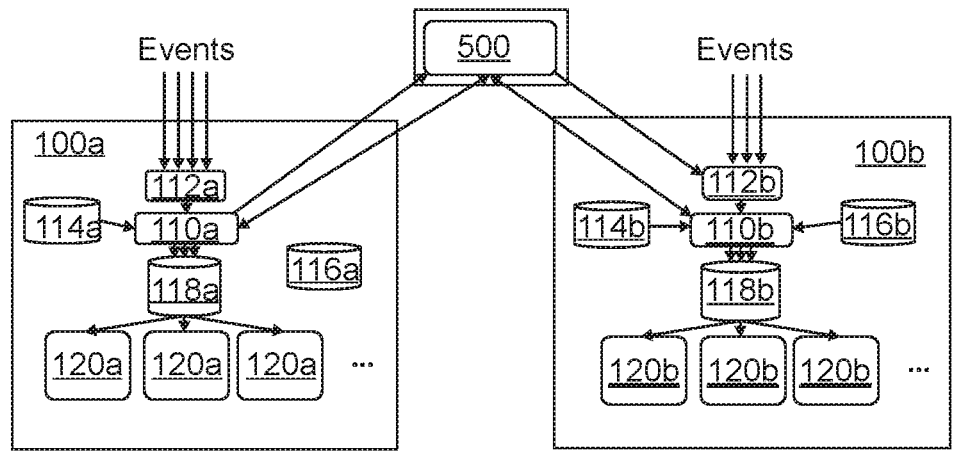
FIG. 5 shows an exemplary computing environment comprising first and second serverless computing infrastructures with a global load balancer, in accordance with embodiments of the present disclosure.

FIG. 5 shows an exemplary computing environment comprising a first serverless computing infrastructure 100a and a second serverless computing infrastructure 100b with a global load balancer 500 communicatively interfacing the platforms 100a and 100b, in accordance with embodiments of the present disclosure. Each of the serverless computing infrastructures 100a and 100b, respectively comprise, as described before and without limitation, a web server 112a, 112b, a storage or database 114a, 114b, an availability checker 116a, 116b, a stream processor 118a, 118b, and one or more executing nodes 120a, 120b.

First and second serverless computing infrastructures, 100a and 100b, as such are independently operating serverless infrastructures (receiving, via their web servers 112a, 112b, and processing different streams of event information) which may be located at geographically different locations. The global load balancer enables routing of workload between the first and second serverless infrastructures 100a and 100b, wherein the second serverless infrastructure 100b shown may represent a selected one (by the global load balancer 500) out of a plurality of second serverless infrastructure nodes 100b.

The global load balancer 500 is shown connected to each of first and second serverless computing infrastructures 100a, 100b with an upper and a lower arrow, both indicating a standard functionality of the system. The lower arrows illustrate a regular data exchange between the global load balancer 500 and each serverless computing infrastructure 100a, 100b which allows the global load balancer 500 to keep a status record of the available infrastructures updated. This may include requesting and/or receiving infrastructure-specific status information such as health data, latency timings as well as load and capacity figures by the global load balancer 500.

The upper arrows indicate a routing procedure which is typically initiated by one of the available serverless computing infrastructures, in the example shown the first serverless computing infrastructure 100a. The first serverless computing infrastructure 100a regularly checks internally a dispatch condition, which may include without limitation a workload characteristic (e.g., all executing nodes 120a are busy, or a 10-second load average over all executing nodes 120a is above a threshold value, or an instantaneous free computing capacity is below a threshold value, etc.). If the dispatch condition is fulfilled, the first controller 110a requests the global load balancer 500 to start external execution of a given application logic which was being handled by the first serverless computing infrastructure 100a when or after the condition became fulfilled. The request may include the given application logic, its associated metadata, event information and/or parameters to be passed, and/or references to some or all of these.

The global load balancer 500 then contacts the second serverless computing infrastructure 100b or filters an internal platform status record to determine whether a suitable platform is available which fulfills all (or most of) the execution requirements associated with the given application logic. In the example shown, the second serverless computing infrastructure 100b is selected. The global load balancer then forwards some or all of the received data associated with the given application logic to the selected second serverless computing infrastructure 100b for internal queueing and/or distribution of the task to one of its executing nodes 120b by the second invocation controller 110b and its periphery nodes 112b, 114b, 116b, 118b. Platform controller 110b collects and returns the execution result to the first controller 110a via the global load balancer 500 in an analogous manner as described before.

Figure 6:
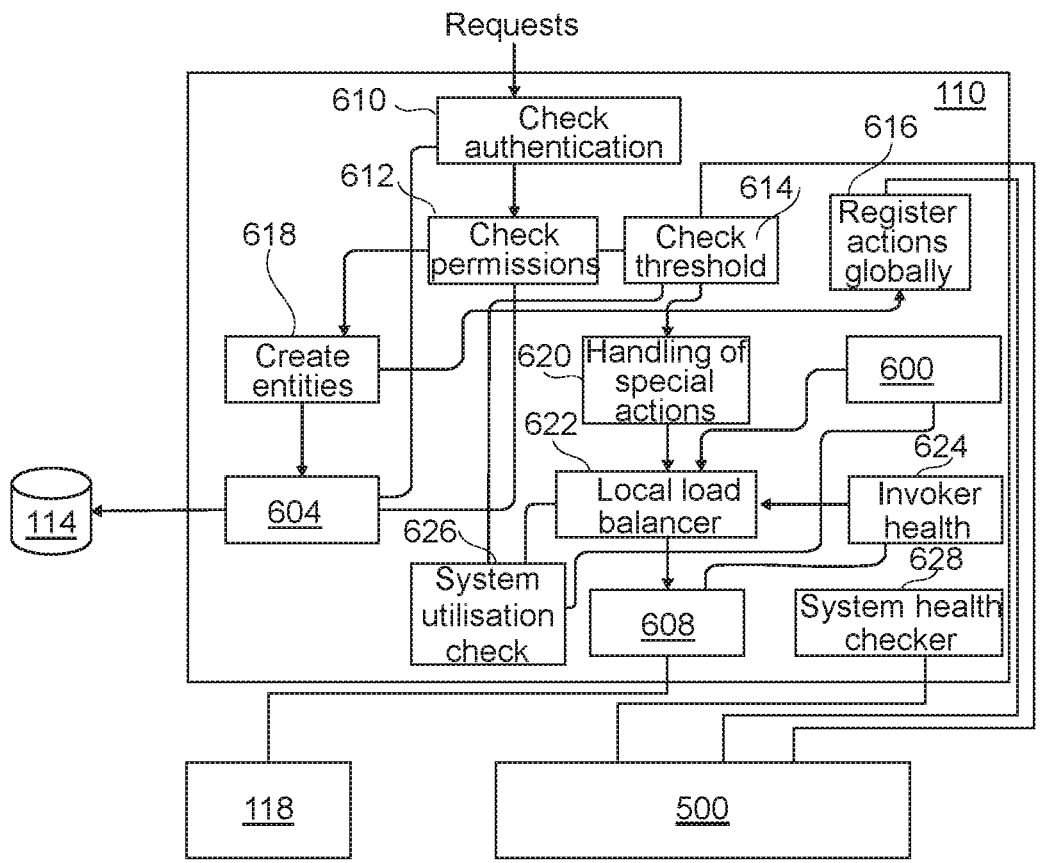
FIG. 6 is a block diagram illustrating internal functions of an exemplary invocation controller node supporting a global load balancer, in accordance with embodiments of the present disclosure.

FIG. 6 is a block diagram illustrating internal functions of an exemplary invocation controller node 110 which implements support for a global load balancer 500, in accordance with embodiments of the present disclosure. Standard functions as well as enhanced functions according to the present disclosure are shown as module blocks. The standard functions include a cluster interface 600 enabling clustering with one or more further local platforms not shown here; a database interface 604 offering connectivity to database 114; a database interface 604 offering connectivity to database 114; a stream processor interface 608 offering connectivity to stream processor 118; a module 610 for verifying authentication of a caller identity; a module 612 for verifying permissions of a verified caller identity; an entity creation module 618 for creating new event types (also referred to as actions associated with one or more application logics) in the database and/or creating and registering a new abstraction instance of a further serverless platform becoming newly available; a module 620 for applying exception rules for identifying special actions; an internal load balancer 622 managing utilization of the execution nodes 120 (not shown) which are internal to serverless computing infrastructure 100; and an invoker health report module 624 for requesting and/or listening to status information of the internal executing nodes 120.

Enhancement modules relating to global load balancing (the enhanced functions mentioned above) include a module 614 for verifying one or more dispatch conditions and triggering external invocation via the global load balancer 500 if the dispatch conditions are met; a system utilization checker 626 providing input information to the dispatch monitor 614, a system health checker 628 collecting and reporting and/or exchanging additional status information relating to some or all nodes of serverless computing infrastructure 100 to or with the global load balancer 500; and a module 616 for registering new actions globally via the global load balancer 500. Functions of the enhancement modules are described in more detail in the following Figures.

Figure 7:
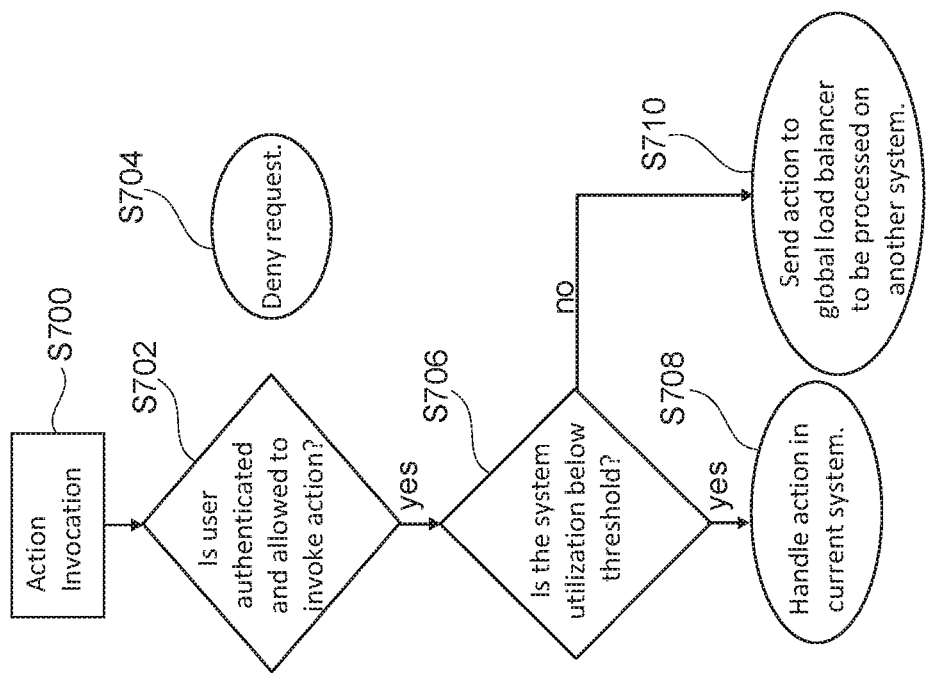
FIG. 7 illustrates a process flow of a dispatch decision in an invocation controller node supporting a global load balancer, in accordance with embodiments of the present disclosure.

FIG. 7 illustrates a process flow of an exemplary dispatch decision in an invocation controller node 110a supporting a global load balancer 500, in accordance with embodiments of the present disclosure. The controller receives S700 an invocation request and uses modules 610, 612 to determine S702 if the requesting user is authenticated and allowed to invoke the action (the application logics associated with the event information). If the user fails authentication or authorization, the request is denied S704.

The platform utilization checker 626 receives and optionally derives utilization information from the local load balancer 622 and passes the resulting utilization information to the decision module 614. This may optionally be preceded by an intra-cluster distribution attempt via module 600, initialized by an early utilization check by module 626 itself and forwarding to the global dispatch condition checker 614 only in case that cluster-internal execution is found unavailable or unfeasible. If the dispatch condition checker 614 is called, it verifies S706 if a current system utilization of the whole first serverless computing infrastructure 100a (or equivalent measures such as those described before) fulfills a predetermined dispatch condition (or equivalently, does not fulfill a condition for platform-internal execution). If a local condition is fulfilled, the action is queued S708 locally for invocation by one of the local executing nodes 120a. If a local execution is unfeasible, the invocation request is forwarded S710 to the global load balancer 500.

Figure 8:
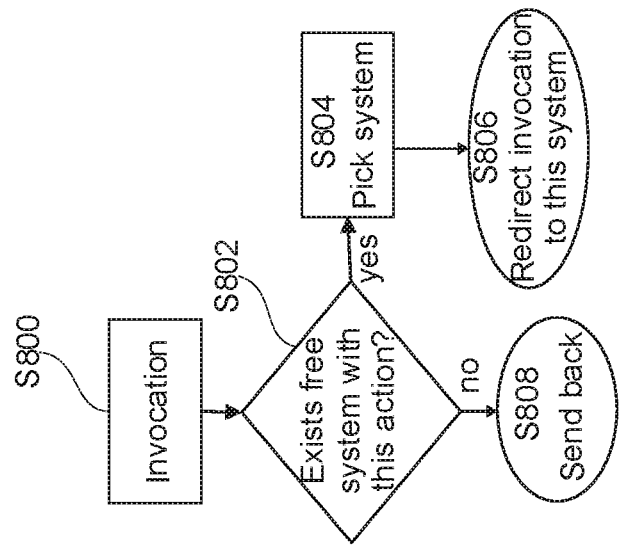
FIG. 8 illustrates a process flow of a distribution decision in a global load balancer, in accordance with embodiments of the present disclosure.

FIG. 8 illustrates a process flow of an exemplary distribution decision in a global load balancer 500, in accordance with embodiments of the present disclosure. The global load balancer receives S800 an invocation request from a first serverless computing infrastructure 100a and checks S802 locally or by requesting whether a suitable and free second serverless computing infrastructure 100b can be found. If this is true, it selects S804 a second serverless computing infrastructure 100b and forwards S806 the request and its associated data (as described above) to the selected infrastructure. If no platform is found to be both suitable (matching the invocation requirements specified in the event information and/or the metadata of the application logic to be invoked) and free (i.e., sufficient computing capacity available or becoming available within a satisfactory latency limit), the request is denied or sent back S808 to the requesting first serverless computing infrastructure 100a.

Figure 9:
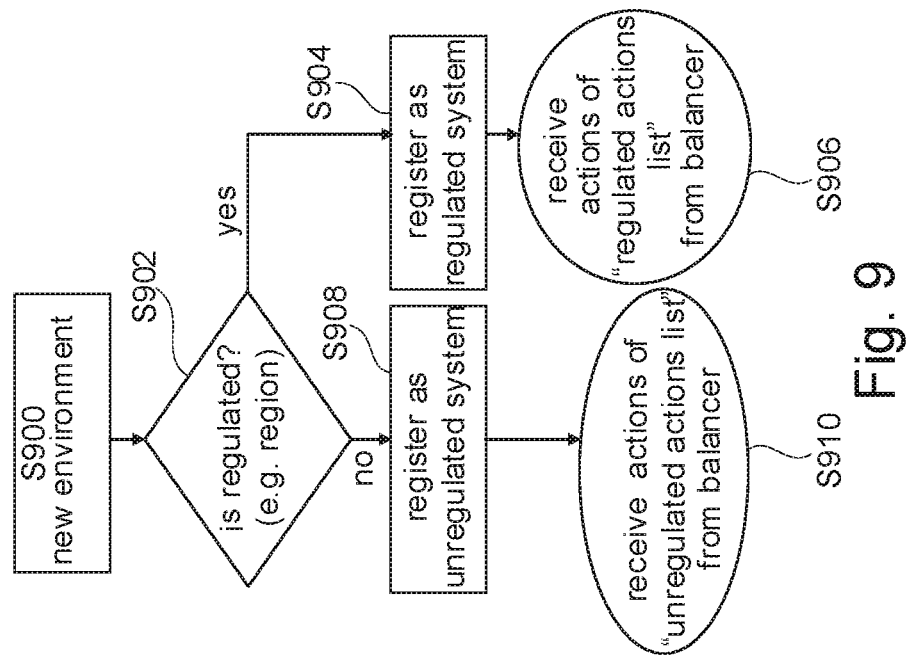
FIG. 9 illustrates a process flow of a regulation-aware registration of a new serverless computing infrastructure at a global load balancer, in accordance with embodiments of the present disclosure.

FIG. 9 illustrates an exemplary process flow of a regulation-aware registration of a newly available serverless computing infrastructure 100 at a global load balancer 500, in accordance with embodiments of the present disclosure. The global load balancer 500 receives S900 an availability information from the newly available serverless computing infrastructure 100. The global load balancer 500 then checks S902 whether the availability information complies to requirements imposed by one or more known regulations (e.g., the European General Data Protection Regulation (GDPR)). The requirement specifications may be stored, for example, in a database internal or local to the global load balancer 500. If a regulation compliance is found, the new serverless computing infrastructure 100 is registered S904 internally as a regulated platform (e.g., including a specification of the kind of compliance) and is reserved for being contacted S906 exclusively (e.g., together with other platforms offering the same kind of compliance) if an invocation request requiring said regulation arrives at the global load balancer 500. If no regulation compliance is found, the new serverless computing infrastructure 100 is registered S908 internally as an unregulated infrastructure and is thus available for being contacted S910 for handling general invocation requests which do not require compliance to a regulation.

Figure 10:
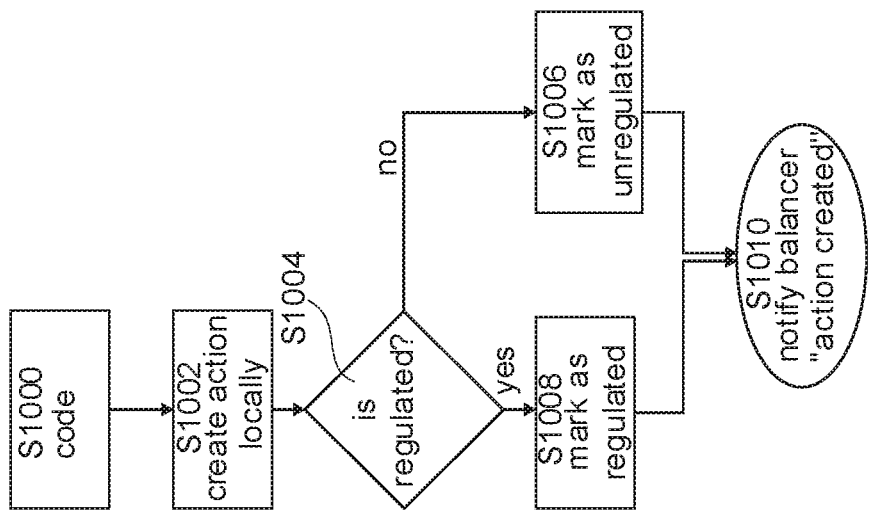
FIG. 10 illustrates a process flow of a regulation-aware creation of a new action in an invocation controller node supporting a global load balancer, in accordance with embodiments of the present disclosure.

FIG. 10 illustrates an exemplary process flow of a regulation-aware creation of a new action in an invocation controller node 110 supporting a global load balancer 500, in accordance with embodiments of the present disclosure. The controller 110 receives S1000 a new application logic and checks whether the new logic is registered in the database 114. If this is not the case, it uses its entity creation module 618 to create S1002 a new action dataset in the database, comprising the (source or machine) code of the new application logic and any metadata received with the event information comprising the new code. If a verification S1004 on the metadata and/or the code reveals that the code requires or complies with a given regulation specification, a regulation mark and/or specifier is added S1008 to the metadata of the new code. Otherwise, the module 618 marks S1006 the code as unregulated. The controller then uses the global registration module 616 to send S1010 a notification about the completed creation of a new action to the global load balancer 500. This notification includes at least an identifier describing the new code or action and the regulation descriptor just created. The regulation may further include the new code and/or its further associated metadata.

Figure 11:
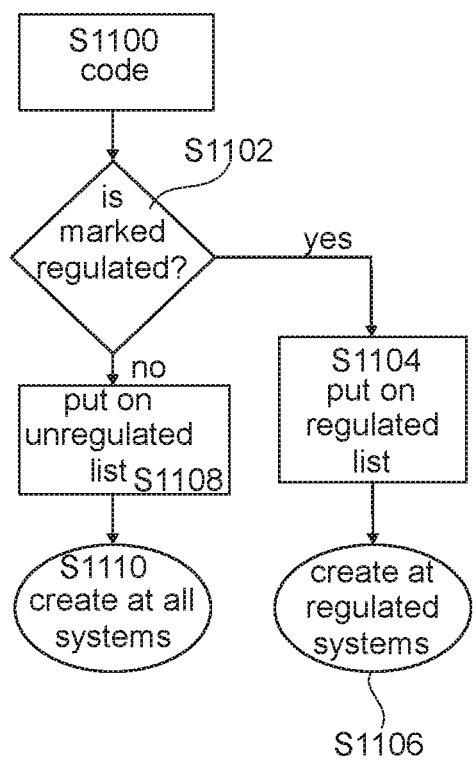
FIG. 11 illustrates a process flow of a regulation-aware response of a global load balancer to a creation of a new action, in accordance with embodiments of the present disclosure.

FIG. 11 illustrates an exemplary process flow of a regulation-aware response of a global load balancer 500 to a local creation of a new action, in accordance with embodiments of the present disclosure. The global load balancer 500 receives S1100 at least the identifier describing the new code, or action, and the regulation descriptor which was created locally. The global load balancer 500 then verifies S1102 if the new action is marked as regulated. If it is regulated, the global load balancer 500 optionally retrieves further information related to the new action or code from the creating platform and stores S1104, S1108 the available information in a local list or database of available actions or application logics. There may be separate lists for regulated and unregulated actions (S1108) (e.g., one list for each kind of regulation), or the database includes a suitable regulation descriptor, etc. In case the action is stored S1104 as regulated, the controller 110 forwards S1106 the available action data to all further platforms which comply to the regulation as required of fulfilled by the new action. In case the action is stored S1108 as unregulated, the controller 110 forwards S1110 the available action data to all available platforms. Each receiving platform uses the corresponding entity creation module 618 of its invocation controller 110 to create a platform-local copy of the new action.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for distributed code execution involving a first serverless computing infrastructure, the first serverless computing infrastructure comprising one or more first infrastructure nodes, the one or more first infrastructure nodes comprising a first invocation controller node and one or more first executing nodes, the one or more first infrastructure nodes being communicatively coupled to one or more client nodes, the one or more client nodes being external to the one or more first infrastructure nodes, the method comprising, by the first invocation controller node:

identifying an application logic associated with the event information, the application logic including metadata, wherein the metadata comprises a required service level and a wait figure;

receiving, from an invoker group, at least one support identifiers from each of one or more candidate nodes of the invoker group, wherein the one or more candidate nodes comprises at least one of the one or more first executing nodes and one of the one or more client nodes;

determining, based on the least set of privacy features of the at least one execution requirement, if the application logic requires internal execution on one of the one or more first executing nodes;

selecting, from the invoker group, a candidate node to act as an invoker node, wherein the invoker node executes the application logic, the invoker node having the at least one support identifiers corresponding to the least set of privacy features of the at least one execution requirement;

determining a waiting queue position for the application logic, wherein the waiting queue position is based on a ranking according to the required service level and a sub-ranking according to a wait figure, wherein the wait figure is representative of an elapsed wait time for the execution of the application logic;

causing the invoker node to execute the application logic;

causing the invoker node to provide a result of the executed application logic; and receiving the result.

2. The method of claim 1, wherein the invoker node executes within a software framework, and wherein the execution of the application logic comprises interpreting the application logic by the software framework.

3. The method of claim 2, wherein the communicative coupling between one of the one or more client nodes and the one or more first infrastructure nodes comprises a session between the one of the one or more client nodes and a web server, wherein the web server hosts a web page, and wherein the web page embeds an implementation of the software framework as a browser-executable code, wherein the one of the one or more client nodes executes a web browser, the method further comprising:
receiving an availability information, wherein the availability information is generated by the software framework in response to the web page being loaded by the web browser; and
determining a membership of the one of the one or more client nodes in the invoker group based on the availability information.

4. The method of claim 1, wherein each invoker node from the invoker group further comprises:
receiving a health status information of each of the invoker nodes according to a predetermined schedule; and
determining a membership of each of the invoker nodes, from the invoker group, based on the health status information.

5. The method of claim 1, wherein the one or more first infrastructure nodes further comprise a first application repository node, wherein the first application repository node stores one or more hosted application logics, the one or more hosted application logics comprising the application logic, the method further comprising:
tracking an execution indicator specific to the one or more hosted application logics;
aggregating the execution indicator into a capacity figure specific to the one or more hosted application logics; and
in response to the capacity figure specific to the one or more hosted application logics is within a predetermined low-capacity range, selecting one of the one or more client nodes as the invoker node.

6. The method of claim 1, further comprising:
causing the invoker node to keep the application logic initialized after the execution.

7. The method of claim 6, wherein the selecting, from the invoker group, the invoker node for executing the application logic further comprises:
determining an initialized group specific to the application logic, wherein a given invoker node from the invoker group is in the initialized group if the given invoker node is keeping the application logic initialized, wherein the given invoker node is selected from the initialized group if the initialized group is not empty.

8. The method of claim 1, further comprising:
receiving from a candidate node, from the invoker group, one or more of the following support identifiers relating to the candidate node: a current capacity utilization; an available computing capacity; a system health information; a latency figure; and an indicator for support of private execution, wherein the event information further comprises an execution requirement, wherein selecting the invoker node further comprises determining the candidate node with an agreement to the execution requirement by comparing the execution requirement to a respective one or more support identifiers received from each candidate node in the invoker group; and
selecting the candidate node with the agreement as the invoker node.

9. The method of claim 1, wherein the communicative coupling of the one or more first infrastructure nodes comprises a permanent connection between the first invocation controller node and each of the one or more first executing nodes, and wherein the communicative coupling of the one or more first infrastructure nodes to the one or more client nodes comprises a connection via a wide-area network.

10. The method of claim 1, wherein the one or more first infrastructure nodes further comprises a dispatching node, the invoker group further comprises the dispatching node, wherein the dispatching node provides a communications interface to a global load balancer, the global load balancer being further communicatively coupled to one or more second serverless computing infrastructures, each of the one or more second serverless computing infrastructures comprising one or more communicatively coupled second infrastructure nodes, the one or more communicatively coupled second infrastructure nodes comprising a second invocation controller node and one or more second executing nodes, wherein, if a predetermined dispatch condition is fulfilled, the selection comprises selecting the dispatching node as the invoker node, and the causing of the invoker node to execute the application logic and provide a result of the execution comprises, via the dispatching node, causing the global load balancer to:
select one of the one or more second executing nodes of the selected one or more second serverless computing infrastructures to execute the application logic; and
cause the second invocation controller node of the selected one or more second serverless computing infrastructures to:
select one of the one or more second executing nodes of the selected one of the one or more second serverless computing infrastructures to execute the application logic; and
cause the selected one or more second executing nodes to execute the application logic and provide a result of the execution.

11. The method of claim 10, wherein the predetermined dispatch condition comprises selecting the dispatching node as the invoker node if an aggregate current capacity utilization of the one or more first executing nodes exceeds a predetermined first threshold value.

12. The method of claim 10, wherein the selection of one of the one or more second serverless computing infrastructures for executing the application logic is based on one or more of the following status indicators of a respective one or more second serverless computing infrastructures: a current capacity utilization; an available computing capacity; a system health information; a latency figure; and an indicator for support of private execution.

13. The method of claim 10, wherein the waiting queue position for the application logic is determined utilizing the second invocation controller based on the wait figure of the elapsed wait time, a desired maximum wait time, and a typical execution time aggregating past run time measurements of the application logic.

14. The method of claim 13, wherein the metadata further comprises a distribution time measured between the receipt of the event information and the selection of the selected one or more second computing infrastructures, and wherein the determination of the sub-ranking comprises calculating a sub-rank priority value P using the formula $$P = A(1 - W/M) + B(1 - D)/E,$$

wherein A and B are free parameters, W is the wait figure, M is the desired maximum waiting time, D is a distribution time, and E is the typical execution time.

15. The method of claim 14, wherein the causing of the selected one or more second computing infrastructures further comprises:
if P is greater than or equal to a predetermined critical sub-rank priority value, causing the second invocation controller to cancel an execution of a low-priority application logic, wherein the low-priority application logic has an assigned sub-rank priority value less than the predetermined critical sub-rank priority value.

16. The method of claim 15, wherein canceling the execution of the low-priority application logic is performed according to a cancellation priority, wherein the low-priority application logic is assigned a highest cancellation priority if the low-priority application logic causes the selected one or more second computing infrastructures to perform a housekeeping function, followed by a second cancellation priority if the execution of the low-priority application logic has an expected relative remaining execution time below a second threshold value, followed by a third cancellation priority if the execution of the low-priority application logic has a largest expected absolute remaining execution time.

17. The method of claim 10, wherein the global load balancer further utilizes a second application repository, further comprising:
if the application logic is not registered at the second application repository, causing the global load balancer to register the application logic at the second application repository and distribute the application logic to the selected one or more second serverless computing infrastructures.

18. The method of claim 10, wherein the event information comprises an identifier requiring compliance with a regulation specification, and wherein the selected one or more second serverless computing infrastructures complies with the regulation specification, the dispatch condition comprises:
selecting the dispatching node as the invoker node if the first serverless computing infrastructure is not compliant with the regulation specification, wherein the selection of the one or more second serverless computing infrastructures for executing the application logic is restricted to the one or more second serverless computing infrastructures that are compliant.

19. A computer program product including one or more computer readable storage mediums collectively storing program instructions that are executable by a processor or programmable circuitry to cause the processor or the programmable circuitry to perform a method for distributed code execution involving a first serverless computing infrastructure, the first serverless computing infrastructure comprising one or more first infrastructure nodes, the one or more first infrastructure nodes comprising a first invocation controller node and one or more first executing nodes, the one or more first infrastructure nodes being communicatively coupled to one or more client nodes via a wide-area network, the method comprising, by the first invocation controller node:
receiving an event information, wherein the event information includes at least one execution requirement including an indicator requesting a least set of privacy features, wherein the least set of privacy features of the at least one execution requirement dictates the processing of the event information;
identifying an application logic associated with the event information, the application logic including metadata, wherein the metadata comprises a required service level and a wait figure;
receiving, from an invoker group, at least one support identifiers from each of one or more candidate nodes of the invoker group, wherein the one or more candidate nodes comprises at least one of the one or more first executing nodes and one of the one or more client nodes;
determining, based on the least set of privacy features of the at least one execution requirement, if the application logic requires internal execution on one of the one or more first executing nodes;
selecting, from the invoker group, a candidate node to act as an invoker node, wherein the invoker node executes the application logic, the invoker node having the at least one support identifiers corresponding to the least set of privacy features of the at least one execution requirement;
determining a waiting queue position for the application logic, wherein the waiting queue position is based on a ranking according to the required service level and a sub-ranking according to a wait figure, wherein the wait figure is representative of an elapsed wait time for the execution of the application logic;
causing the invoker node to execute the application logic;
causing the invoker node to provide a result of the executed application logic; and
receiving the result.

* * * * *